No. 611,767. Patented Oct. 4, 1898.
G. BOSSOW.
HOSE REEL.
(Application filed Oct. 12, 1896.)
(No Model.) 2 Sheets—Sheet 1.
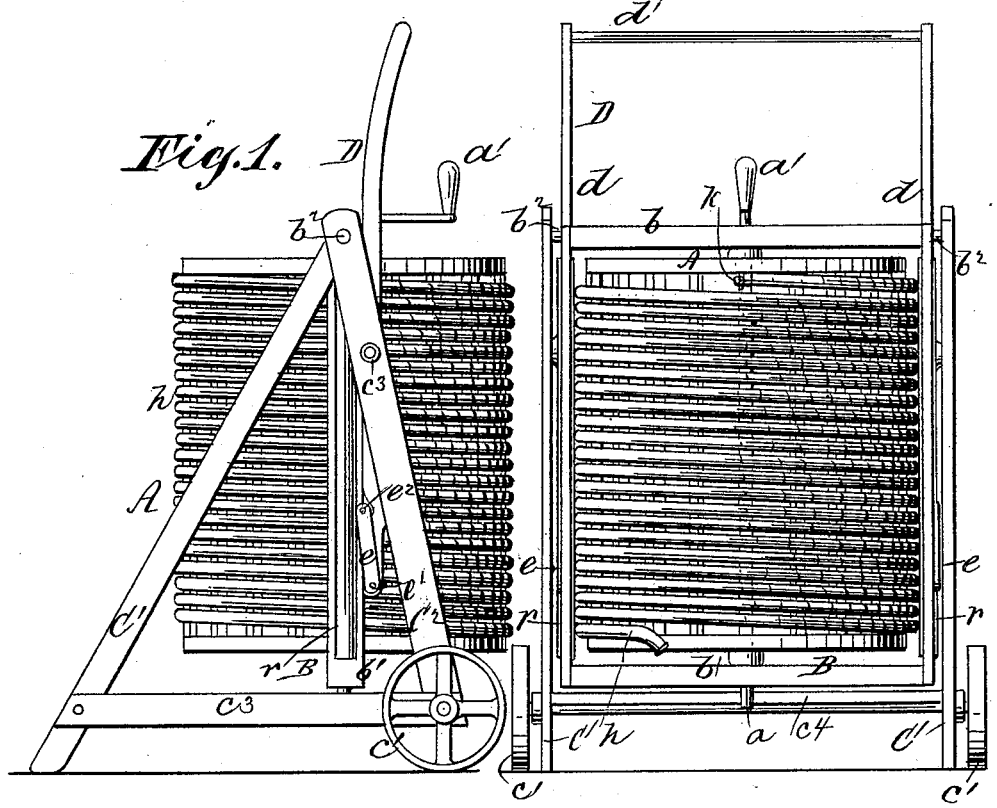
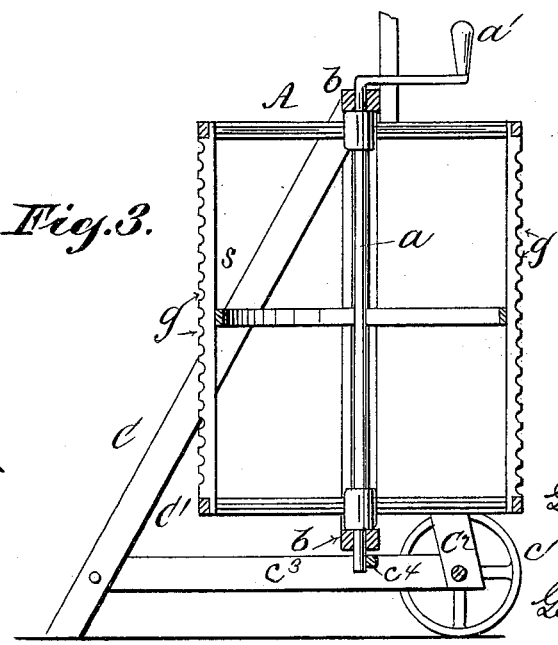
Witnesses.
D. W. Gardner.
Louis N. Rowley.
Inventor:
George Bossow
By his Attorney
George William Miatt
THE NORRIS PETERS CO., PHOTO-LITHO., WASHINGTON, D. C.

No. 611,767. Patented Oct. 4, 1898.
G. BOSSOW.
HOSE REEL.
(Application filed Oct. 12, 1896.)
(No Model.) 2 Sheets—Sheet 2.
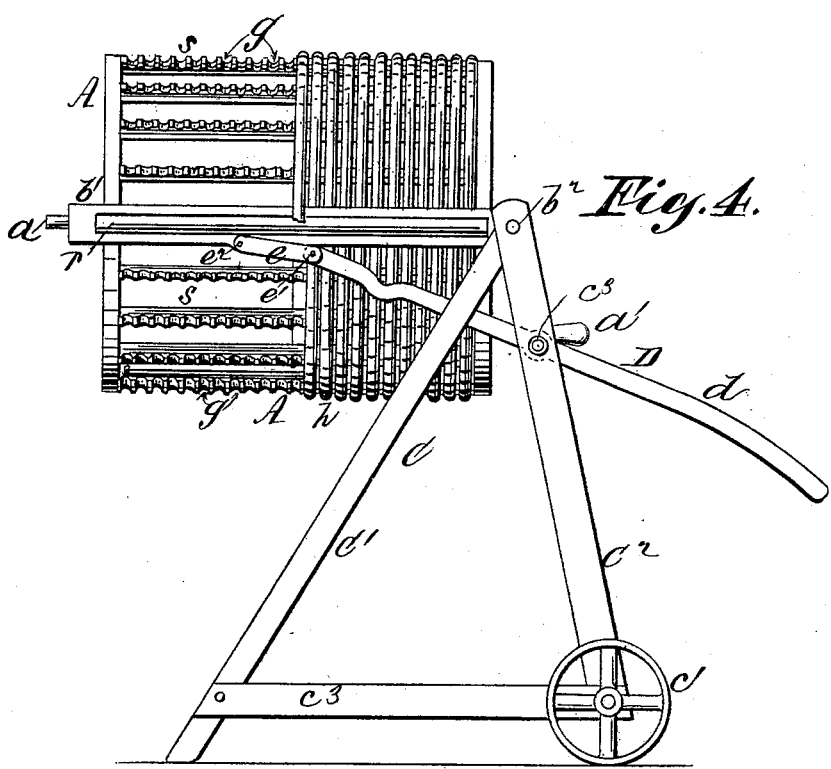
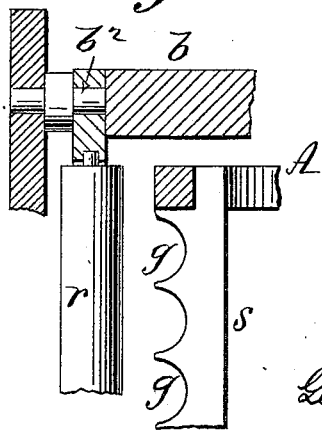

UNITED STATES PATENT OFFICE.

GEORGE BOSSOW, OF NEW YORK, N. Y.

HOSE-REEL.

SPECIFICATION forming part of Letters Patent No. 611,767, dated October 4, 1898.

Application filed October 12, 1896. Serial No. 608,578. (No model.)

*To all whom it may concern:*

Be it known that I, GEORGE BOSSOW, a citizen of the United States, residing in the city of New York, (Brooklyn,) in the county of Kings and State of New York, have invented certain new and useful Improvements in Hose-Reels, of which the following is a specification sufficient to enable others skilled in the art to which the invention appertains to make and use the same.

My invention relates to reels for hose, the main design being to provide for the effectual drainage of the hose after it has been wound upon the reel.

While the principle of my invention is applicable to the storage of hose of various descriptions, it is especially adapted to the requirements of garden-hose and hose of a similar character in frequent use.

The distinguishing feature of my invention consists in arranging and supporting a hose-reel upon a movable truck in such manner that the hose may be wound upon it while the reel is in a substantially horizontal position, the reel being then made to assume a substantially vertical position, so that the hose wound spirally around the reel will naturally drain itself automatically, the reel and its supporting-frame being of a portable character, substantially as hereinafter set forth.

The invention also includes special features of construction and arrangement, hereinafter described and claimed.

In the accompanying drawings, Figure 1 is a side elevation of my device, showing the reel in its vertical position. Fig. 2 is a rear elevation. Fig. 3 is a vertical section, all but two of the hose-supporting slats being omitted; Fig. 4, a side elevation showing the reel in horizontal position; Fig. 5, a sectional elevation showing in large detail the parts immediately adjacent to one of the trunnions.

The reel A is mounted on a shaft $a$, supported by the cross-pieces $b\ b$ of the frame B, consisting of said cross-pieces $b\ b$ and the side members $b'\ b'$. One of the cross-pieces $b$ is provided with the trunnions $b^2$, by which the frame B is pivotally connected to the upper part of the carriage C, provided with the wheels $c'$ to facilitate transportation. The carriage C may be of any desired or suitable form of construction, that shown in the drawings consisting of the uprights $C'\ C^2$ and cross-bars $c^3\ c^4$.

The handle D performs a double function, in that it is adapted for use in propelling the device and also for sustaining the reel in a horizontal position, as shown in Fig. 4. It consists of the parallel members $d$, connected at the outer end by the handle $d'$ and connected at the inner end by the reel-frame B through the medium of the toggles $e$. The side members $d\ d$ are pivotally connected to and supported between the uprights $C'\ C^2$ of the carriage C.

The toggles $e$ are of such length and are so pivotally connected to the ends of the parallel side members $d$ of the handle D and to the side members $b'$ of the reel-frame B that when the handle $d'$ is depressed sufficiently to bring the reel into the position shown in Fig. 4 the reel-frame will rest upon the inner ends of the said side members of the handle, the pivots $e'$ passing beyond a line drawn from the pivots $e^2$ to the pivots $e^3$, and thereby locking and sustaining the reel-frame and reel in a horizontal position or one substantially horizontal.

The shaft $a$ of the reel A is provided with a crank-handle $a'$ or equivalent means for rotating the reel upon its axis. The reel A may consist of a cylindrical drum formed with the peripheral spiral groove $g$; but to render the parts lighter I prefer to form the said spiral groove in a series of equidistant slats $s$; or, in other words, the semicircular recesses formed in the slats $s$ for the reception of the hose are so arranged as to constitute practically a spiral groove $g$, extending from one end of the reel or drum to the other.

The side members $b'$ of the reel-frame are provided with rollers $r$, arranged to bear lightly against the hose upon the reel, confining it thereto and preventing all slip or looseness of the hose upon the reel, at the same time avoiding all objectionable frictional contact with the hose.

In operation the reel is elevated in a substantially horizontal position, as indicated in Fig. 4, by depressing the handle-bar $d'$, the toggles $e$ locking the parts in position. One end of the hose $h$ is passed up between the periphery of the reel and one of the side rollers, and is then connected by a suitable device (as with a hook or shoulder $k$, engaging with the hose-coupling) to the inner end of the reel and the latter turned by means of the crank-handle $a'$, winding the hose into the spiral groove $g$, the rollers $r$ $r$ on opposite sides confining the hose and keeping it taut. When the hose has been fully wound up, the handle-bar $d'$ is raised, bringing the reel into vertical position, or substantially so, as shown in Figs. 1 and 2, when it is obvious that any water in the hose will drain out of the latter owing to its spiral arrangement upon the reel.

By my invention I not only lengthen the life of the hose by effecting the complete drainage thereof, thereby preventing rotting and chemical action, but I also arrange the hose in a most advantageous manner, avoiding all twisting or kinking as well as undue compression.

What I claim as my invention, and desire to secure by Letters Patent, is—

1. A hose-reel comprising a supporting-truck, rollers at one end thereof, extended portions adapted in conjunction with said rollers to support the truck upon end in a vertical position, and a drum rotatably mounted on the truck and arranged longitudinally of the latter, whereby the drum may occupy a vertical position corresponding to that of the truck when the latter is standing upon one end, in the manner and for the purpose specified.

2. The combination of the reel A, formed with the spiral groove $g$, the reel-frame B, the carriage C, upon which the reel-frame B, is pivotally supported, the handle-frame D, pivotally connected to the carriage C, and toggles $e$, connecting the said handle-frame D, with the reel-frame B, substantially in the manner and for the purpose described.

3. The combination of the reel A, formed with the spiral guiding and receiving groove $g$, or equivalent, for the hose, the reel-frame B, provided with the rollers $r$, $r$, the carriage C, upon which the reel-frame B, is pivotally supported at one end, and means for sustaining the reel and frame in substantially horizontal and vertical positions, for the purpose and substantially in the manner described.

GEORGE BOSSOW.

Witnesses:
 JOHN B. KING,
 FRED. A. DUNN.